United States Patent [19]

Palmer

[11] Patent Number: 5,178,734
[45] Date of Patent: Jan. 12, 1993

[54] WATER DISTILLING APPARATUS WITH VERTICALLY STACKED COMPONENTS

[75] Inventor: David G. Palmer, Lincoln, Nebr.

[73] Assignee: International Water Technologies, Inc., Lincoln, Nebr.

[21] Appl. No.: 481,024

[22] Filed: Feb. 16, 1990

[51] Int. Cl.$^5$ .................. B01D 3/02; B01D 3/42
[52] U.S. Cl. .................. 202/176; 759/44; 759/DIG. 13; 759/DIG. 40; 202/160; 202/181; 202/185.3; 202/185.5; 202/188; 202/202; 202/206; 203/1; 203/2; 203/7; 203/10; 210/259
[58] Field of Search ........... 202/176, 188, 200, 185.5, 202/181, 160, 206, 202, 185.3; 203/10, 1, 2, DIG. 18, 6, 12, 91, 7; 159/44, DIG. 13, DIG. 40; 210/266, 259

[56] References Cited

U.S. PATENT DOCUMENTS

| | | | |
|---|---|---|---|
| 364,199 | 5/1887 | Coyle | 202/188 |
| 497,742 | 5/1893 | Allderdice | 202/188 |
| 552,688 | 1/1896 | Jewell | 202/188 |
| 557,102 | 3/1896 | Bentley | 202/188 |
| 725,182 | 4/1903 | Van Ausdal | 202/190 |
| 787,093 | 4/1905 | Gathmann | 202/188 |
| 1,361,910 | 12/1920 | Schubert | 202/188 |
| 2,289,956 | 7/1942 | Gans et al. | 202/188 |
| 3,351,536 | 11/1967 | Fox | 202/188 |
| 3,607,666 | 9/1971 | Roller | 203/10 |
| 3,725,268 | 4/1973 | Gelblum | 203/7 |
| 3,860,494 | 1/1975 | Hickman | 203/10 |
| 4,018,656 | 4/1977 | Rogers et al. | 203/11 |
| 4,612,090 | 9/1986 | Ellis, Jr. | 202/176 |
| 4,795,532 | 1/1989 | Mizutani et al. | 203/7 |
| 4,943,353 | 7/1990 | Shannon | 203/1 |

FOREIGN PATENT DOCUMENTS

| | | | |
|---|---|---|---|
| 0157149 | 4/1922 | United Kingdom | 202/188 |
| 8707847 | 12/1987 | World Int. Prop. O. | 202/176 |
| 8809308 | 12/1988 | World Int. Prop. O. | 203/10 |

*Primary Examiner*—Virginia Manoharan
*Attorney, Agent, or Firm*—Hovey, Williams, Timmons & Collins

[57] ABSTRACT

A water distilling apparatus (10) which includes vertically stacked components, i.e. an uppermost water storage tank (12), an intermediate boiling tank (14) and a lowermost condensing unit (16). Stacking of the distiller components creates a space efficient design with ready access to the respective components. The preferred apparatus (10) is also equipped with a small, dedicated water conditioning unit (20) situated between the main solenoid water valve (94) and the inlet of the boiling tank (14).

8 Claims, 2 Drawing Sheets

3## WATER DISTILLING APPARATUS WITH VERTICALLY STACKED COMPONENTS

BACKGROUND OF THE INVENTION

1. Field of the Invention

The present invention is concerned with an improved water distilling apparatus characterized by provision of vertically stacked components, i.e., the unit is designed to present an uppermost water storage tank, an intermediate boiling tank, and a lowermost condenser. In addition, the invention includes provision of a water conditioning apparatus positioned downstream of the main solenoid-operated water valve of the distiller so as to isolate the conditioner from normal water line pressures and to minimize the size of the conditioner.

2. Description of the Prior Art

Various devices for the purification of drinking water have been proposed in the past, both in the context of home use and in larger systems. Broadly speaking, such devices have generally involved filtration with activated carbon or the like, reverse osmosis through semipermeable membranes, or distillation. The latter approach has typically been used the least, especially in home purification systems, because of the rather complex equipment involved in home distillers. To the extent that these devices have been employed, however, they have typically been in the form of a rather large cabinet housing a side by side boiling tank and condenser, with a lower storage tank. Such a distiller arrangement is not space efficient, can be difficult to clean, and cannot be located out of doors. The latter factor can be significant, especially in hot climates, inasmuch as distillers can give off significant heat during operation thereof.

Minerals contained in distiller feedwater can also become concentrated in the boiling tank as distillation proceeds, resulting in the deposition of scale on the inside of the tank and heating element. This must be removed regularly by mechanical or chemical means to keep the distiller operable.

Some prior distillers employ automatic valves that regularly drain the contents of the boiling tank to reduce such scaling. While they are partially effective, scaling does occur and periodic cleaning is still required. It is recognized that the use of softened water greatly decreases scale formation due to sodium salts having much greater solubilities than calcium and magnesium salts. Whole-home water conditioning systems are expensive and complex due to the volume of water they must soften, the need for automatic recharging equipment, and a requirement for them to withstand static mains pressure.

Accordingly, there is a distinct need in the art for an improved distilling device which avoids the aforementioned problems and provides a water distiller suited for home use. Additionally, the functionality of such a distiller would be greatly improved by the optional addition of a small dedicated water conditioning apparatus.

SUMMARY OF THE INVENTION

Broadly speaking, the water distilling apparatus of the present invention includes the usual components of such a device, namely a water boiling tank adapted to receive and boil incoming water, condensing means coupled with the boiling tank for receiving vapors and condensing the same, and a storage tank coupled with the condensing means for receiving and storing of condensed distillate. However, these components are uniquely oriented in the present invention such that the boiling tank, condensing means and storage tank are in a vertically stacked relationship with the storage tank above the boiling tank, and with the boiling tank above the condensing means. In this fashion, the distiller is extremely space efficient with a small footprint, the components can be readily accessed for removal, cleaning or replacement, and the unit may readily be positioned out of doors.

In particularly preferred forms of the invention, the boiling tank includes a pair of water level probes therein for controlling boiling tank operation, these probes being operatively connected to the main incoming water valve of the distiller and to the heating element associated with the boiling tank. Further, the preferred condensing means comprises a lower most coil, with a rotatable cooling fan disposed within the convolutions of the coil. If desired, the apparatus may also be equipped with a water conditioner in the form of an upright, cylindrical resin-containing conditioning cell including an inlet and an outlet. The conditioner inlet is connected downstream of the water solenoid valve while the outlet is connected to the boiling tank. When the distiller heating element is operating the conditioner housing will be subjected to the pressure that can be developed in the boiling tank. This is limited by the static leg of distillate from the condenser up to the water storage container and is typically 1-2 psi.

When water is being added to the boiling tank the pressure developed in the conditioner housing remains low due to the throttling effect of the solenoid valve, and there being no restrictions between the conditioner and the boiling tank, which is itself open to atmosphere through the condensing coil.

The connection from the water solenoid to the conditioner inlet is made with thin walled tubing so that even if a restriction did occur downstream of the conditioner the tubing would fail before the conditioner housing was subjected to anything but minor pressures. Therefore, the conditioner need not be fabricated from expensive, pressure-resistant materials and need be sized only for conditioning of drinking water quantities, typically 2-3 gallons of water per day for a normal household. Also, because of the low daily water usage, the conditioning apparatus does not require automatic recharging equipment as the resin charge is capable of softening all the water used for distillation for several months. Once depleted it can be manually recharged using a salt solution, or it can be discarded and replaced.

DESCRIPTION OF THE PREFERRED EMBODIMENT

Figures 1, 2:
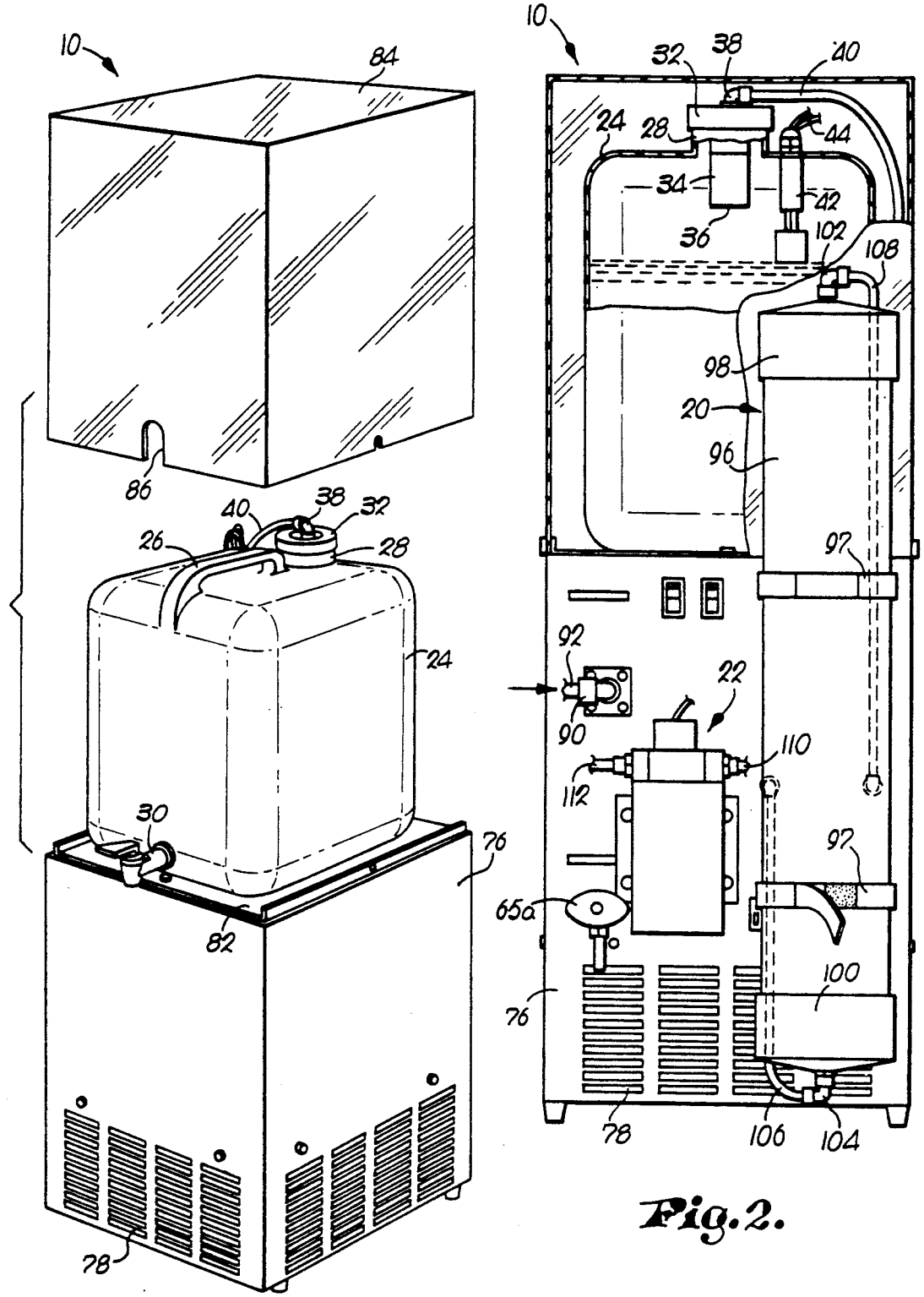
FIG. 1 is an exploded perspective view of the preferred, vertically stacked distilling apparatus of the invention.
FIG. 2 is a rear view thereof, with parts broken away and in partial section.

Turning now to the drawings, a distilling apparatus 10 in accordance with the invention broadly includes an uppermost water storage tank 12, an intermediate boiling tank 14, lowermost condensing unit 16, a cabinetry and cover assembly 18, optional water conditioning unit 20, and optional pump 22.

In more detail, water storage tank 12 is in the form of an upright, integral synthetic resin tank 24 presenting an upper handle 26, fill opening 28 and selectively operable spigot 30. The opening 28 is covered by a threaded cap 32 having a depending filter cartridge 34 affixed thereto. The cartridge 34 is filled with activated carbon or similar filtering media, and has a perforated bottom wall 36. If desired, a small porous bag of high grade finely divided calcium carbonate can also be placed in cartridge 34 in order to remineralize the distilled water entering tank 12. Such may be desirable inasmuch as distilled water tends to be acidic due to carbon dioxide given off by carbonates and bicarbonates which break down during heating; such treatment may also enhance the taste of the distilled water. The upper end of cap 32 is equipped with an elbow fitting 38 which communicates through cap 32 to the interior of cartridge 34. An elongated water line 40 is secured to a fitting 38 and leads to the outlet of condensing unit 16 as will be described. Finally, the tank 24 is equipped with a depending water level sensor 42 which extends through the top wall of the tank (see FIG. 2); a pair of sensor leads 44 extend from the upper end of the sensor 42 for connection with the overall control circuitry for the apparatus 10.

Boiling tank 14 is in the form of an upright, cylindrical metallic body 46 having surrounding thermal insulation 48 and a removable top cover 50; the latter is releasably secured in place by means of transverse clamp assembly 52, and a peripheral seal 54 is provided around the margin of cover 50 for sealing engagement with the uppermost lip of the boiling tank. The cover 50 is also provided with an inlet fitting 56 and an outlet fitting 58 respectively in communication with the interior of the tank, along with a pair of level probes 60, 62 which extend into the tank. It will be observed that the probe 60 is substantially longer than the probe 62, and the significance of this feature will be explained hereinafter. Finally, the boiling tank 14 is equipped with a lower heating element 64 for selective boiling of water therein, as well as a lowermost drain line 65 leading to a manual drain spigot 65a.

Condensing unit 16 includes an elongated, finned tube condensing coil 66 presenting a plurality of vertically stacked convolutions. The coil 16 further has an upper inlet 68 and a lower outlet 70. Although not shown in the drawings, it is preferred that the inlet and outlet pipe sections below the wall 80 and extending to the inlet and outlet 68, 70 likewise be equipped with external fins up to the level of horizontal wall 80; this added finning gives enhanced condensing properties. A circulating air fan 72 is disposed within the coil convolutions, and is powered by means of motor 74 for rotation about a vertical axis.

As can be readily appreciated from a review of the drawings, the above described components are oriented in a vertically stacked relationship. To this end, the assembly 18 includes a lowermost, upright, essentially square in cross section metallic cabinet 76 whose sidewalls are louvered as at 78 adjacent the coil 66. In addition, the cabinet includes an internal, metallic, horizontal wall 80 designed to support boiling tank 14 and the condensing unit 16; and an uppermost horizontal metallic wall 82 designed to support storage tank 12. The latter is preferably covered by means of a transparent or translucent box-like cover 84 equipped with a recess 86 for accommodating spigot 30.

Figure 3:
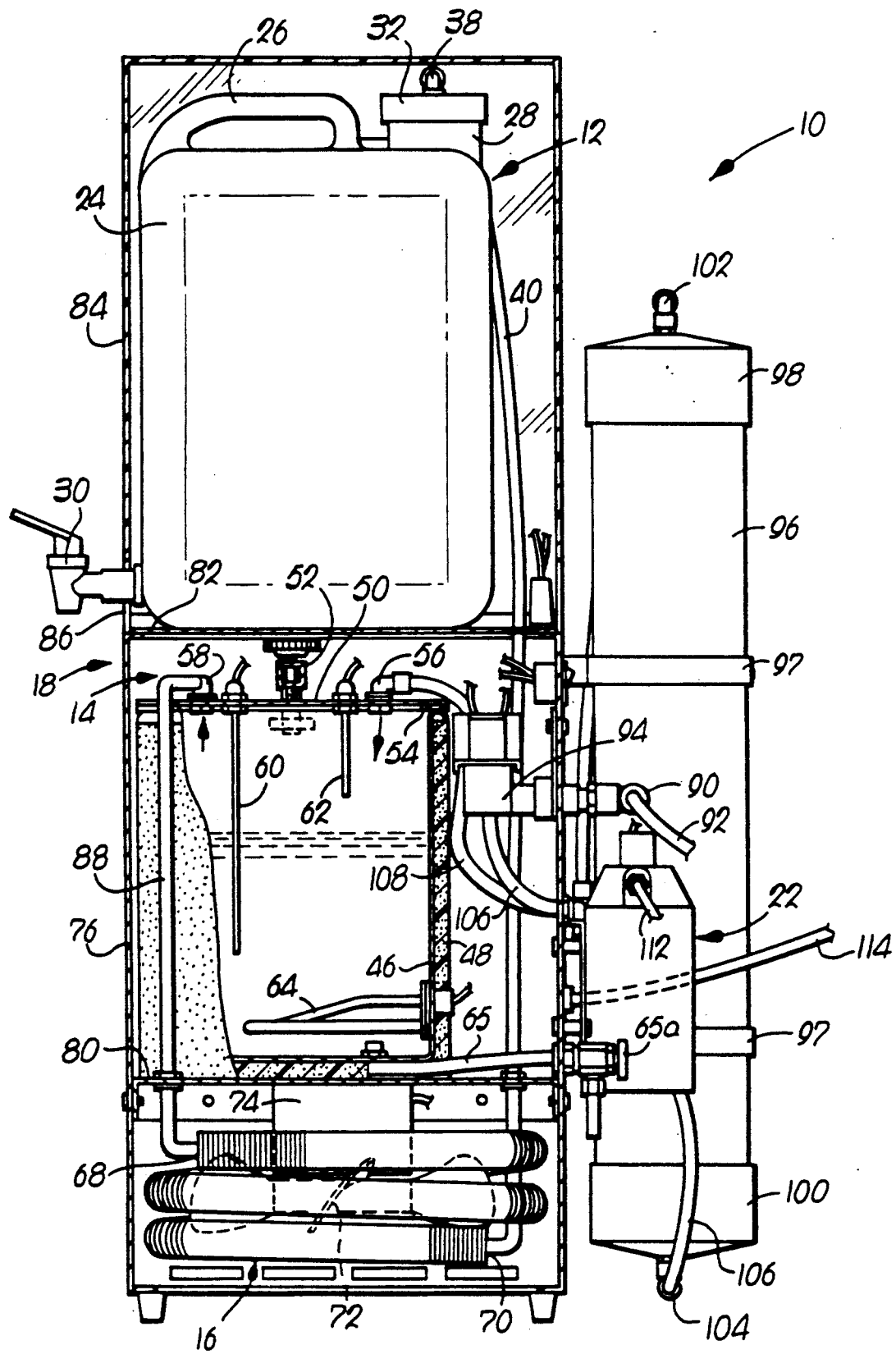
FIG. 3 is a vertical sectional view thereof, with parts broken away for clarity.

Again referring to FIG. 3, it will be observed that a distillate line 88 extends between and is operatively coupled to outlet fitting 58 and coil inlet 68, for conveyance of distillate from boiling tank 14 to condensing unit 16. Furthermore, it will be seen that the water line 40 connected with storage tank cap fitting 38 extends vertically the entire length of apparatus 10 and is connected to the outlet 70 of condensing coil 66. In order to provide incoming water to the apparatus 10, a water fitting 90 is secured to the exterior of the rear wall of cabinet 76, and a water line 92 is connected thereto. The fitting 90 is connected to a selectively actuatable solenoid water valve 94 affixed to the rear cabinet wall. The valve 94 may in turn be connected directly to the inlet fitting 56 of boiling tank 14 for providing fresh water to the latter. However, in the embodiment illustrated, an upright water conditioning unit 20 is employed. This unit includes a tubular body 96 releasably secured to the cabinet 76 by means of velcro straps 97 and provided with end caps 98, 100 each having a water fitting 102, 104 secured thereto. The interior of the body 96 is filled with conventional water conditioning resin 99. When use is made of such a conditioning unit, a water line 106 extends from solenoid valve 94, through the rear cabinet wall via a conventional fitting, and ultimately to fitting 104 forming a part of lower most end cap 100. A second return water line 108 is connected with upper fitting 102, passes through the rear cabinet wall via a conventional fitting, and is ultimately connected with incoming water fitting 56 attached to boiling tank cover 50.

Where desired, an auxiliary pump 22 may be included which is secured to the rear wall of cabinet 76. The pump 22 is equipped with a water line 110 leading to and communicating with the interior of storage tank 12. A second line 112 is connected with the output of the pump and leads to a remote location where purified drinking water is desired.

Electrical power to the apparatus 10 is provided by means of a conventional electrical cord 114 which passes through the rear wall of cabinet 76 and is operatively connected with conventional electrical control circuitry within the cabinet. This control circuitry is entirely within the skill of the art and is designed to operate the apparatus 10 in the manner hereafter described.

In considering the operation of apparatus 10, it will first be assumed that the storage tank 12 is essentially full of purified water. In such an instance, the apparatus 10 would essentially be shut down, with the boiling tank and condensing unit not in operation. As water is drawn from the storage tank 12, at some point the level within the tank will fall below that of sensor 42. At this point a relay coil forming a part of the control circuitry is actuated and the heating element 64 and fan motor 74 are actuated. This causes the water within tank 14 to boil, effecting passage of distillate vapors out of the tank 14 through line 88 and ultimately to coil 66. The sensor 42 thus serves as a means for sensing the level of water in said storage tank and initiating boiling of water in said boiling tank responsive to a low water level in said storage tank. In the coil, the distillate vapor is condensed by virtue of the cooling effect provided by the fan 72. Condensate floods the lower part of the condensing coil effectively blocking the outlet from the boiling tank. Pressure builds up within the boiler and condenser due to the boiling action until there is sufficient pressure to force the condensate up through line 40 to the storage tank 12. The overpressure in the boiling tank is controlled by the height of the liquid in line 40 and is typically 1-2 psi.

Flooding of the lower section of the condenser, including the vertical finned section, ensures maximum contact between the condensate and the condenser wall. The condensate also spends maximum time in this cooling zone. These factors combine to provide optimum cooling of the, distillate. Of course, as distillate passes from the boiling tank 14, the level of water therein begins to fall. When the water level drops below the longer probe 60, the valve 94 is actuated to cause flow of incoming water to the apparatus 10, either directly to the boiling tank from the valve or through the line 106, conditioner 20 and line 108. When the water level within the boiling tank 14 ascends to a point where shorter probe 62 is contacted, the valve 94 is closed, thereby terminating water addition to the boiling tank. Normally, the sensor 42 within the storage tank 14 is located at least one boiling tank batch level below the top of the storage tank. The controls are such that the distiller shuts down only when a batch has been completed and the water level in the boiler is at a minimum. As the energy associated with this boiling water will not be usefully used, the less water remaining the better will have been the energy utilization. During shut down cold water is added to bring the level up to the higher probe, which reduces the temperature of water in the boiling tank. Thus, should the boiling tank be immediately drained, either manually or automatically, the water being dumped will not be dangerous to humans or the plumbing system.

When cold water is added to the boiling tank, a vacuum is created which could cause distillate in the condensing coil and tubing to be sucked back into the boiling chamber. In order to minimize this loss of production, the distillate line 88 is of small diameter, and the boiling tank batch size is made as large as possible.

The apparatus 10 is also provided with temperature safety controls so that in the event that the electrical control systems fail, an overtemperature thermostat in series with the heating element will open when the heating element becomes exposed. Should the heating element itself malfunction, a thermal fuse in series with the element will operate to shut off power to the heating element.

I claim:
1. Water distilling apparatus comprising:
   a water boiling tank for receiving and boiling incoming water to be distilled;
   condensing means operably coupled with said boiling tank for receiving vapors and condensing the same into a distilled liquid condensate;
   a storage tank for receiving condensate from said condensing means;
   means mounting said boiling tank, condensing means and storage tank in a vertically stacked relationship with said storage tank being above said boiling tank, and said boiling tank being above said condensing means; and
   means for conveying said condensate upwardly from said condensing means to said storage tank, including an upright tubular element interconnecting said condensing means and said storage tank and operable for creating a static leg of distillate to pressurize said boiling tank and said condensing means.

2. Water distilling apparatus as set forth in claim 1, said boiling tank including a pair of water level probes therein for controlling operation of the boiling tank.

3. Water distilling apparatus as set forth in claim 1, said condensing means comprising a coil, with a cooling fan disposed within the convolutions of said coil.

4. Water distilling apparatus as set forth in claim 1, including means for conditioning of said incoming water prior to entrance thereof into said boiling tank.

5. Water distilling apparatus as set forth in claim 1, including a water supply line for delivery of incoming water to said apparatus, selectively operable valve means interposed in said water supply line, water conditioning means including an inlet and an outlet, a first water line operably coupling said valve means and said conditioning means inlet for selective delivery of incoming water to the conditioning means, and a second water line operably coupling said conditioning means outlet and boiling tank for delivery of conditioned water to the boiling tank.

6. Water distilling apparatus as set forth in claim 1 including pump means operably coupled with said storage tank for delivery of stored water therein to a location remote from said distilling apparatus.

7. Water distilling apparatus as set forth in claim 1 including means operably connected with said tubular element downstream of said condensing means for providing a source of calcium carbonate to remineralize said condensate.

8. A water distilling apparatus comprising a boiling tank for receiving incoming water to be distilled, condensing means operably coupled with said boiling tank for condensing vapors therefrom, and a storage tank operably coupled with said condensing means for receiving and storing distillate, said boiling tank, condensing means and storage tank being commonly housed, the apparatus further comprising:
   an incoming water line for delivery of incoming water to said apparatus;
   selectively operable valve means interposed in said incoming water line;
   water conditioning means including a tubular body containing a water conditioning resin, an inlet operably connected to said incoming water line and an outlet operably coupled to said boiling tank, said water conditioning means being located exterior to said boiling tank, condensing means and said storage tank for softening of water prior to delivery to said boiling tank;
   means for detecting the level of water in said boiling tank and operatively coupled to said valve means;
   means for sensing the level of water in said storage tank and initiating boiling of water in said boiling tank responsive to a low water level in said storage tank;
   a first water line operably coupling said valve means and conditioning means inlet for selective delivery of incoming water to the conditioning means upon detection of low water levels in said boiling tank by said sensing means; and
   a second water line operably coupling said conditioning means outlet and said boiling tank for delivery of conditioned water to the boiling tank.

* * * * *